United States Patent
Tezuka et al.

(10) Patent No.: US 9,065,954 B2
(45) Date of Patent: Jun. 23, 2015

(54) ELECTRONIC APPARATUS AND IMAGE FORMING APPARATUS

(71) Applicant: KYOCERA Document Solutions Inc., Osaka (JP)

(72) Inventors: Rie Tezuka, Osaka (JP); Kentaro Naruse, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/027,914

(22) Filed: Sep. 16, 2013

(65) Prior Publication Data
US 2014/0092414 A1   Apr. 3, 2014

(30) Foreign Application Priority Data
Sep. 28, 2012   (JP) .................... 2012-218281

(51) Int. Cl.
*G06K 15/00*   (2006.01)
*H04N 1/00*   (2006.01)

(52) U.S. Cl.
CPC ....... *H04N 1/00896* (2013.01); *H04N 1/00395* (2013.01); *H04N 1/00928* (2013.01); *H04N 2201/0098* (2013.01); *H04N 2201/0094* (2013.01)

(58) Field of Classification Search
CPC .......... H04N 1/00395; H04N 1/00896; H04N 1/00928; H04N 2201/0094; H04N 2201/0098

USPC .................... 358/1.1–1.9, 1.11–1.18
See application file for complete search history.

(56) References Cited

U.S. PATENT DOCUMENTS

| | | | | |
|---|---|---|---|---|
| 4,550,504 | A * | 11/1985 | Mehnert | 33/701 |
| 6,970,183 | B1 * | 11/2005 | Monroe | 348/143 |
| 2012/0327458 | A1 * | 12/2012 | Baba et al. | 358/1.15 |
| 2013/0258424 | A1 * | 10/2013 | Ono et al. | 358/475 |

FOREIGN PATENT DOCUMENTS

JP   2008-064935 A   3/2008

* cited by examiner

*Primary Examiner* — King Poon
*Assistant Examiner* — Ibrahim Siddo
(74) *Attorney, Agent, or Firm* — Knobbe, Martens, Olson & Bear LLP (57) ABSTRACT

An image forming apparatus includes an operating section, a sensor section, an oscillating mechanism, and a control section. The operating section receives an operation command from an operator. The sensor section includes a pyroelectric infrared sensor configured to detect the presence of an object based on a change in infrared rays. The oscillating mechanism is configured to cause the sensor section to perform an oscillating movement. The control section is configured to control the oscillating mechanism to start the oscillating movement upon satisfaction of a condition that the operator as the object operates the operating section within a predetermined period of time after the object has been detected by the sensor section.

7 Claims, 6 Drawing Sheets

ELECTRONIC APPARATUS AND IMAGE FORMING APPARATUS

INCORPORATION BY REFERENCE

This application claims priority to Japanese Patent Application No. 2012-218281 filed on Sep. 28, 2012, the entire contents of which are incorporated by reference herein.

BACKGROUND

The present disclosure relates to electronic apparatuses and image forming apparatuses and particularly relates to a technique for detecting an object with a pyroelectric infrared sensor.

In a general image forming apparatus as an example of an electronic apparatus, a fixing roller of a fixing section configured to fix an image on a recording paper sheet is kept above a certain temperature also during standby for the formation of an image. Thus, an image forming operation can be started in a short time upon receipt of an operator's command to execute the formation of the image. This heating of the fixing section consumes the most power in an image formation process and, therefore, its power consumption is required to be reviewed. As an example of a solution to this, there is proposed an image forming apparatus equipped with a human body sensor. In this image forming apparatus, the heating of the fixing section is started after the detection of a human body by the human body sensor and, thus, the fixing section can be heated by the use of the time from the detection of the human body to the operator's reaching an operating section of the apparatus. Therefore, the fixing temperature during standby can be set lower than in apparatuses equipped with no human body sensor. Furthermore, when any human body becomes undetected by the human body sensor, the image forming apparatus is shifted from a normal mode capable of immediate formation of an image to a sleep mode capable of power saving. Thus, a heater configured to heat the fixing section can be deactivated at an appropriate time to reduce power consumption.

SUMMARY

A technique improved over the aforementioned technique is proposed as one aspect of the present disclosure.

An electronic apparatus according to the one aspect of the present disclosure includes: an operating section, a sensor section including a pyroelectric infrared sensor, an oscillating mechanism, and a control section.

The operating section is operable by an operator.

The sensor section includes the pyroelectric infrared sensor configured to detect the presence of an object based on a change in infrared rays.

The oscillating mechanism is configured to cause the sensor section to perform an oscillating movement in a predetermined direction.

The control section is configured to control the oscillating mechanism to start the oscillating movement upon satisfaction of a condition that the operator operates the operating section within a predetermined period of time after the object has been detected by the sensor section.

DETAILED DESCRIPTION

Figure 1:
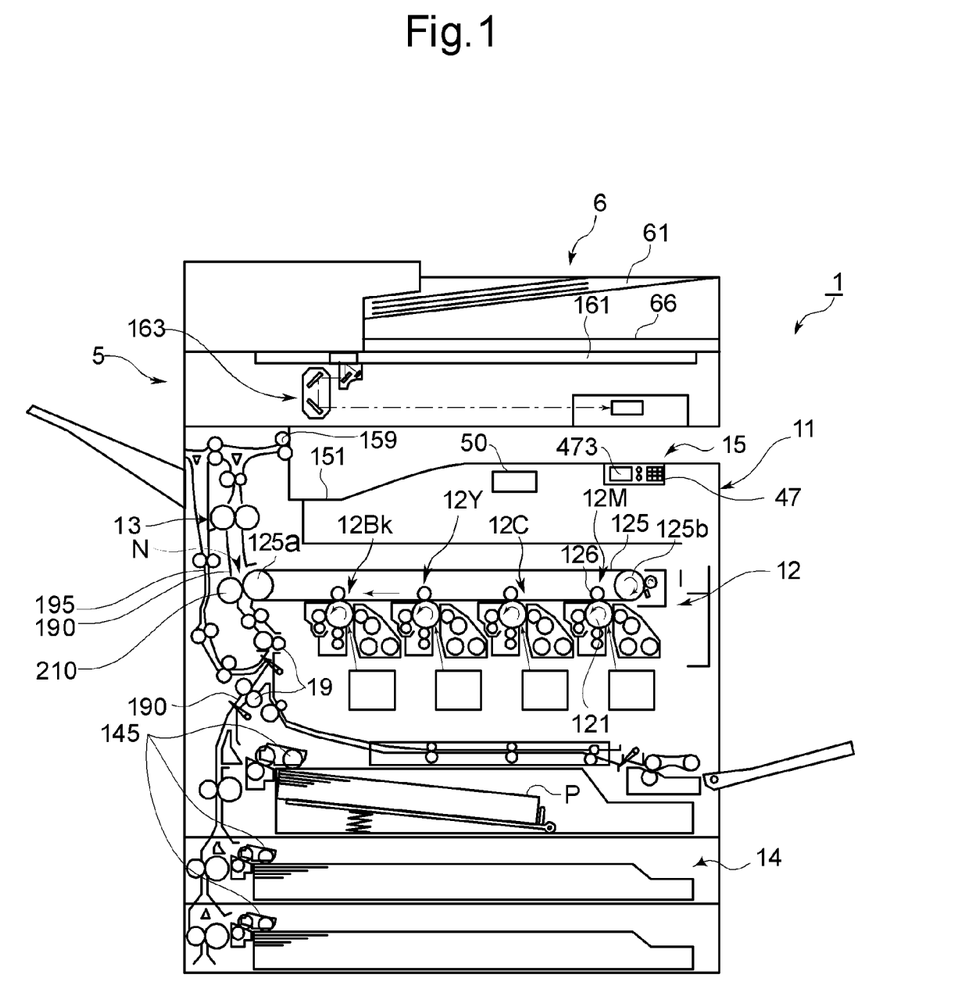
FIG. 1 is a front cross-sectional view showing the structure of an image forming apparatus according to one embodiment of the present disclosure.

Hereinafter, a description will be given of an electronic apparatus according to one embodiment of the present disclosure with reference to the drawings. FIG. 1 is a front cross-sectional view showing the structure of an image forming apparatus as the electronic apparatus according to the one embodiment of the present disclosure.

The image forming apparatus 1 according to the one embodiment of the present disclosure is a multifunction peripheral having multiple functions including, for example, a copy function, a print function, a scan function, and a facsimile function. The image forming apparatus 1 is made up so that an apparatus body 11 includes an operating section 47, an image forming section 12, a fixing section 13, a paper feed section 14, a document feed section 6, a document reading section 5, and so on.

The operating section 47 accepts operator's commands for various types of operations and processing executable by the image forming apparatus 1, such as a command to execute an image forming operation and a command to execute a document reading operation.

In the document reading operation of the image forming apparatus 1, the document reading section 5 optically reads an image of an original document being fed from the document feed section 6 or an image of an original document placed on an original glass plate 161 to generate image data. The image data generated by the document reading section 5 is stored on an internal HDD, a network-connected computer or the like.

In the image forming operation of the image forming apparatus 1, the image forming section 12 forms a toner image on a recording paper sheet P serving as a recording medium fed from the paper feed section 14, based on image data generated by the document reading operation, image data received from a network-connected computer or image data stored on the internal HDD. In the case of color printing, an image forming unit 12M for magenta, an image forming unit 12C for cyan, an image forming unit 12Y for yellow, and an image forming unit 12Bk for black of the image forming section 12 form respective toner images on their respective photosensitive drums 121 through charging, exposure, and developing processes based on respective images of respective different color components constituting the above image data and then allow their respective primary transfer rollers 126 to transfer the toner images to an intermediate transfer belt 125.

The toner images of different colors transferred to the intermediate transfer belt 125 are superposed each other on the intermediate transfer belt 125 by controlling their transfer timings, resulting in a multicolor toner image. A secondary transfer roller 210 transfers the multicolor toner image formed on the surface of the intermediate transfer belt 125, at a nip N between the secondary transfer roller 210 and a drive roller 125*a* with the intermediate transfer belt 125 in between, to a recording paper sheet P conveyed from the paper feed section 14 along a conveyance path 190. Thereafter, the fixing section 13 fixes the toner image on the recording paper sheet P by the application of heat and pressure. The recording paper sheet P on which a multicolor image has been fixed by the completion of the fixing treatment is discharged to a paper output tray 151.

In the case of double-sided printing of the image forming apparatus 1, the recording paper sheet P having an image already printed on one side by the image forming section 12 is nipped between an output roller pair 159, then moved back and conveyed to a reverse conveyance path 195 by the output roller pair 159, and conveyed again upstream of the nip N and the fixing section 13 in a direction of conveyance of the recording paper sheet P by a conveyance roller pair 19. Thus, an image is formed on the other side of the recording paper sheet P by the image forming section 12.

A sensor section 50 is disposed at an appropriate location on the front surface of the image forming apparatus 1, preferably at a laterally central location thereon and a height of 50 to 60 cm from the floor on which the image forming apparatus 1 is installed. The sensor section 50 includes a pyroelectric infrared sensor configured to detect an operator of the image forming apparatus 1 as an object.

Figure 2:
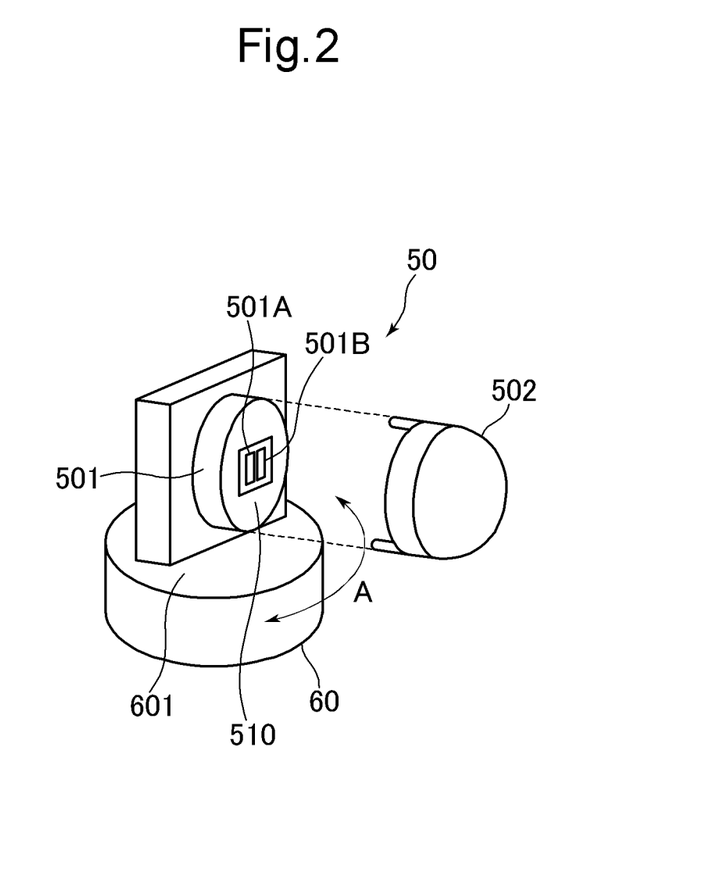
FIG. 2 is a schematic view showing a sensor section and an essential portion of an oscillating mechanism in the one embodiment of the present disclosure.

FIG. 2 is a schematic view showing the sensor section 50 and an essential portion of an oscillating mechanism 60. The sensor section 50 includes the pyroelectric infrared sensor 501 and a lens 502.

The pyroelectric infrared sensor 501 includes a pyroelectric element in which electrodes are provided on both surfaces of a substrate having a pyroelectric effect, and is configured to detect an object (a human body or any other body) within a predetermined sensing area using the pyroelectric element. More specifically, the pyroelectric infrared sensor 501 includes a pyroelectric element which is composed of a pyroelectric substrate made of a ferroelectric or the like and a pair of opposed electrodes provided on both sides of the pyroelectric substrate, and is configured to collect infrared rays generated by an action of a human body to a light receiving portion of the pyroelectric element and convert a signal resulting from a polarization of the pyroelectric element caused depending upon change in infrared rays to a voltage signal. Furthermore, when the voltage signal having undergone predetermined processing is high or low in comparison with a threshold value using a comparator, the pyroelectric infrared sensor 501 regards an object as having been detected and outputs a signal indicating the high level or the low level.

Although no particular limitation is placed on the number of pyroelectric elements included in the pyroelectric infrared sensor 501, the pyroelectric infrared sensor 501 preferably includes a plurality of pyroelectric elements. In this embodiment, a description will be given of an example where the pyroelectric infrared sensor 501 includes a dual element in which two pyroelectric elements 501A, 501B are juxtaposed. The pyroelectric elements 501A, 501B are horizontally aligned and therefore have their respective light receiving areas at horizontally different locations. When either one of the pyroelectric elements 501A, 501B detects an object, the sensor section 50 determines that the object has been detected. Both the light-receiving surface electrodes or both the opposed surface electrodes of the pyroelectric elements 501A, 501B are series-connected so that the respective charges generated on the light-receiving surface electrode and opposed surface electrode of each pyroelectric element by a temperature change of the pyroelectric substrate have opposite polarities. Thus, the accuracy of detecting an object can be improved over the case where a single pyroelectric element is used.

The lens 502 is, for example, a Fresnel lens, serves to extend the field of view of the pyroelectric infrared sensor 501, and further serves to collect respective sets of infrared rays generated in respective predetermined ranges for the pyroelectric elements in the sensing area and apply the respective collected sets of infrared rays to the respective pyroelectric elements of the pyroelectric infrared sensor 501. In particular, the horizontal field of view is set, for example, at 55 degrees for each pyroelectric element 105*a*, 105*b* with respect to the sensor surface 510 of the pyroelectric infrared sensor 501, i.e., at 110 degrees in total, in order to detect a human body approaching the image forming apparatus 1 from the right or left.

Furthermore, the sensor section 50 is mounted on the oscillating mechanism 60. The oscillating mechanism 60 is a transferring mechanism capable of turning the sensor section 50 in a predetermined direction. The oscillating mechanism 60 serves to turn the pyroelectric infrared sensor 501 so that even when an operator as an object for the sensor section 50 stands still at a location anterior to the image forming apparatus 1 which is within the sensing area of the sensor section 50, the sensor section 50 can detect the presence of the operator.

The oscillating mechanism 60 supports the bottom of the sensor section 50 and is formed, for example, in a disc shape. The oscillating mechanism 60 turns about a rotation axis located at the center of the circle of a circular top surface 601 thereof horizontally as shown by the arrow A in FIG. 2 and a predetermined number of degrees to each of the right and left from an initial position. The oscillating mechanism 60 includes, for example, a stepping motor. The stepping motor serves as a drive source for the turning movement of the oscillating mechanism 60. The oscillating mechanism 60 is provided at the bottom with an unshown rotating shaft located at the center of turning movement and turns about the rotating shaft by a rotary drive force supplied from the stepping motor. The turning movement and movement at the angle of turn of the oscillating mechanism 60 are controlled under the control of a control section 100 to be described later which controls the number of revolutions of the stepping motor.

The sensor section 50 is fixed to a rotating shaft (not shown) on the top surface 601 of the oscillating mechanism 60. Thus, when the oscillating mechanism 60 turns to the right and left, the sensor section 50 also oscillates together with the oscillating mechanism 60. The angle of the oscillating movement is set at an angle that can cover the predetermined sensing area which is anterior to the image forming apparatus 1 and over which the pyroelectric infrared sensor 501 detects an object.

The direction of oscillation of the sensor section 50 caused by the oscillating mechanism 60 driven by the stepping motor may be the right-and-left (horizontal) direction or the top-to-bottom (vertical) direction of the image forming apparatus 1. Alternatively, a diagonal direction is also possible as the direction of oscillation of the sensor section 50. However, in these cases, the pyroelectric elements 501A, 501B of the pyroelectric infrared sensor 501 should be juxtaposed along the direction of oscillation and the rotating shaft to be supplied with a rotary drive force from the stepping motor should extend in a direction orthogonal to the direction of oscillation.

Figure 3:
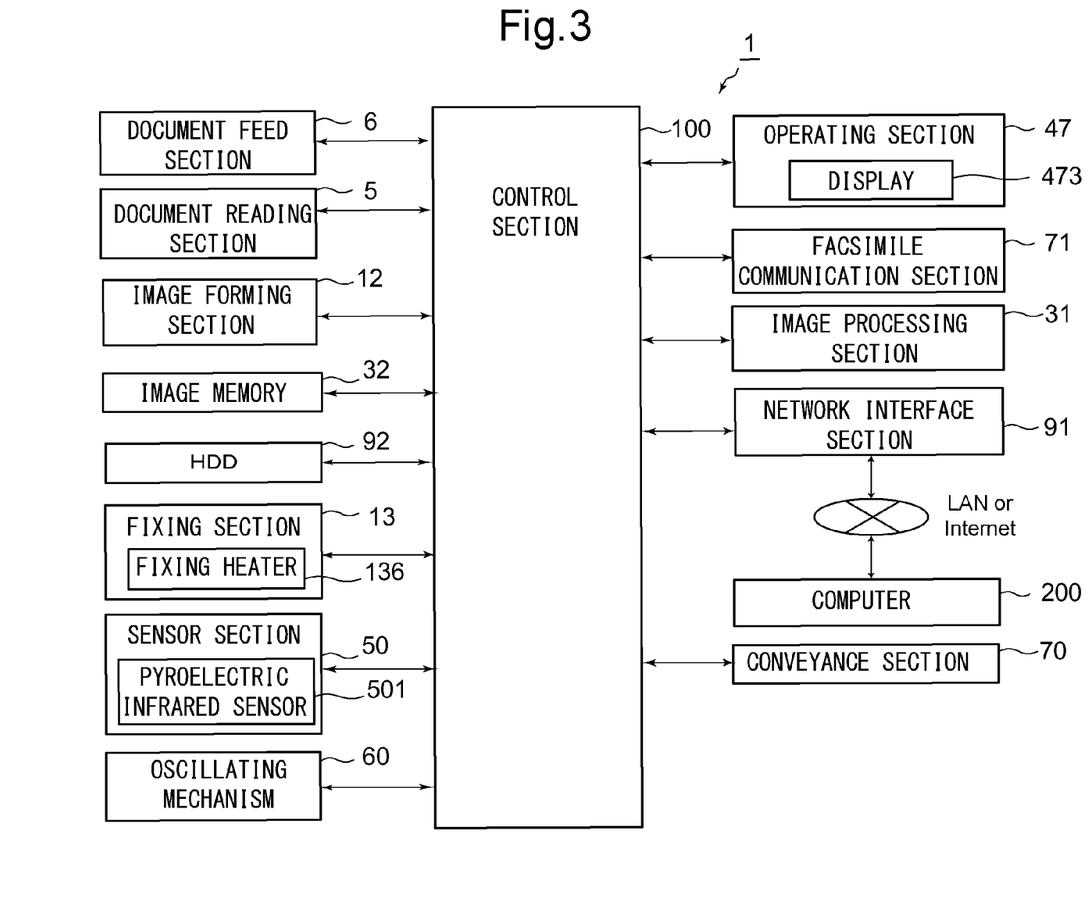
FIG. 3 is a block diagram showing an essential internal architecture of the image forming apparatus according to the one embodiment of the present disclosure.

The structure of the image forming apparatus 1 will next be described. FIG. 3 is a functional block diagram showing an essential internal architecture of the image forming apparatus 1.

The image forming apparatus 1 includes a control section 100. The control section 100 is composed of a CPU (central processing unit), a RAM, a ROM, a dedicated hardware circuit, and so on and governs the overall operation control of the image forming apparatus 1.

The control section 100 is connected to the document reading section 5, the document feed section 6, an image processing section 31, an image memory 32, the image forming section 12, the operating section 47, a facsimile communication section 71, a network interface section 91, an HDD (hard disk drive) 92, the sensor section 50, the oscillating mechanism 60, the conveyance section 70, and so on and controls the operations of these components.

The document reading section 5 is under the control of the control section 100 and includes a reader 163 including a lighting part, a CCD sensor, and so on. The document reading section 5 reads an image from an original document by irradiating the document with light from the lighting part and receiving the reflected light on the CCD sensor.

The image processing section 31, if necessary, processes image data of the image read by the document reading section 5. For example, in order that the image read by the document reading section 5 is improved in quality after the formation of an image in the image forming section 12, the image processing section 31 performs predetermined image processing, such as shading correction.

The image memory 32 provides a region for temporarily storing data of image of the original document read by the document reading section 5 and temporarily storing data to be printed by the image forming section 12.

The image forming section 12 forms an image of print data read by the document reading section 5, an image of print data received from the network-connected computer 200, or the like.

The operating section 47 accepts operator's commands for various types of operations and processing executable by the image forming apparatus 1. The operating section 47 includes a display 473.

The facsimile communication section 71 includes a coding/decoding section, a modulation/demodulation section, and an NCU (network control unit), all of which are not illustrated, and performs facsimile communication using a public telephone network.

The network interface section 91 is constituted by a communication module, such as a LAN board, and transfers various data to and from computers 200 and the like in a local area via a LAN or the like connected to the network interface section 91.

The HDD 92 is a large storage device capable of storing document images and the like read by the document reading section 5.

The fixing section 13 fixes the image formed by the image forming section 12 on a recording paper sheet using a heat roller and a pressure roller.

The conveyance section 70 is a section configured to convey, along a conveyance path 190, the recording paper sheet P from the paper feed section 14 to the nip N between the intermediate transfer belt 125 and the secondary transfer roller 210, the fixing section 13, a paper output section 15, and so on. The conveyance section 70 includes the conveyance path 190, a paper feed roller 145 provided in the paper feed section 14, the conveyance roller pairs 19 provided at different locations in the conveyance path 190, and drive sources (not shown) for these rollers.

The sensor section 50 includes the pyroelectric infrared sensor 501 configured to detect the presence of an object based on a change in infrared rays and notifies the control section 100 that an object has been detected or not.

The oscillating mechanism 60 oscillates the sensor section 50 by the operation of the stepping motor controlled by the control section 100.

The control section 100 controls the oscillating mechanism 60 to start an oscillating movement upon satisfaction of a condition that an operator operates the operating section 47 within a predetermined period of time after the operator as an object has been detected by the sensor section 50 (for example, within a period of time obtained by adding an arbitrarily-selectable suspended time until the start of the operation to the time taken for the operator as the object to move from a location of entry from anterior to the image forming apparatus 1 into a detectable area of the sensor section 50 to a location capable of operating the operating section 47 located at the front of the image forming apparatus 1).

Furthermore, when the object becomes undetected by the sensor section 50 after the control section 100 has allowed the oscillating mechanism 60 to start the oscillating movement, the control section 100 controls the oscillating mechanism 60 to stop the oscillating movement.

Moreover, the control section 100 can selectively set the image forming apparatus 1 to a normal operation mode for bringing the image forming apparatus 1 into a normally operable state or a sleep mode for bringing the image forming apparatus 1 into a power-saving state. If the condition is not satisfied that an operator operates the operating section 47 within the predetermined period of time after the operator as an object has been detected by the sensor section 50, the control section 100 sets the image forming apparatus 1 to the sleep mode. On the other hand, upon detection of an object by the sensor section 50, the control section 100 sets the image forming apparatus 1 to the normal operation mode.

Furthermore, when an operator as an object is detected by the sensor section 50, the control section 100 activates a fixing heater 136 provided in the heat roller of the fixing section 13. Thereafter, if the operator does not operate the operating section 47 within the predetermined period of time after having been detected by the sensor section 50, the control section 100 deactivates the fixing heater 136.

Figure 4:
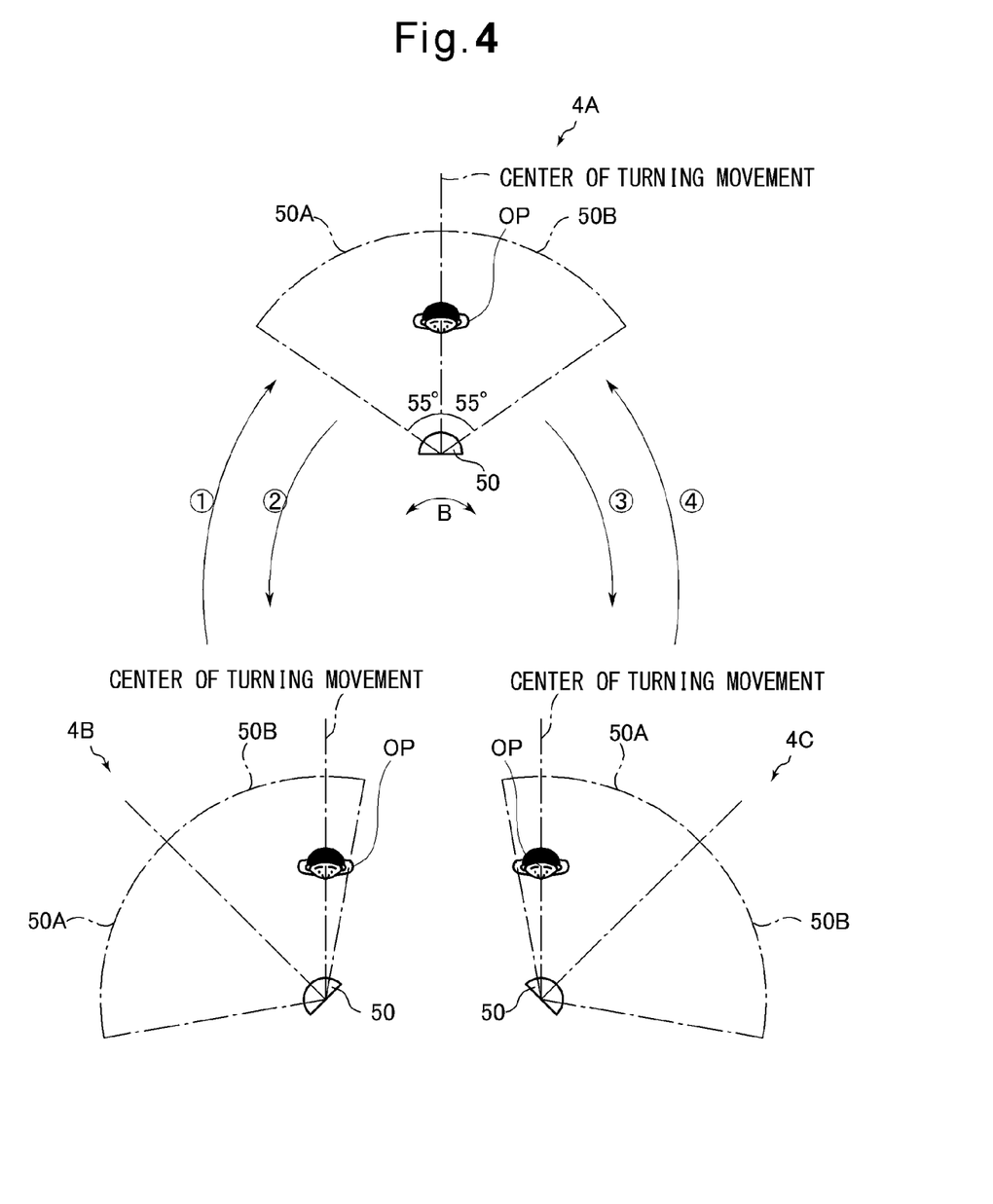
FIG. 4 is schematic view showing how the oscillating sensor section in the one embodiment of the present disclosure detects an operator.

Next, a description will be given of an example where the sensor section 50 detects an operator of the image forming apparatus 1 (an object). FIGS. 4A, 4B and 4C are schematic views showing how the oscillating sensor section 50 detects an operator OP. In this embodiment, the sensor section 50 oscillates in the right-and-left direction of the image forming apparatus 1.

4A of FIG. 4 shows how the sensor section 50 detects an operator OP when facing the front (being in a default position). As described previously, the sensor section 50 in this embodiment has respective sensing zones 50A, 50B for the pyroelectric elements 501A, 501B. When an object radiating infrared rays enters at least one of the sensing zones 50A, 50B, the sensor section 50 senses a change in infrared rays, thus detecting the presence of the object. The sensing zones 50A, 50B are set, as shown in 4A of FIG. 4, to an area located anterior to the image forming apparatus 1 and covering, for example, 55 degrees for each zone with respect to the sensor section 50, i.e., 110 degrees in total. For example, the presence of an operator OP in front of the image forming apparatus 1 and substantially at the middle point in the right-andleft direction can be detected by the sensor section 50. The sensor section 50 oscillates in the right-and-left (horizontal) direction from the default position by the operation of the oscillating mechanism 60.

No particular limitation is placed on the angle of turn for the oscillation caused by the oscillating mechanism 60. For example, the angle of turn for the oscillation caused by the oscillating mechanism 60 is set at 60 degrees (at least 55 degrees equal to the area angle of each of the sensing zones 50A, 50B is necessary) from the default position of the sensor section 50 to each of the left (toward the sensing zone 50A) and right (toward the sensing zone 50B) in 4A of FIG. 4, i.e., at 120 degrees in total.

4B of FIG. 4 shows an example when the sensor section 50 has swung from the default position maximally to the left and how the sensor section 50 detects an operator OP in this state. 4C of FIG. 4 shows how the sensor section 50 detects an operator OP when the sensor section 50 has swung from the default position maximally to the right. When an operator OP is present anterior to the image forming apparatus 1 as in these cases, the control section 100 controls the oscillating mechanism 60 to allow the sensor section 50 to repeat a cycle from the position in 4A of FIG. 4 through the position in 4B of FIG. 4, the position in 4A of FIG. 4, the position in 4C of FIG. 4 and back to the position in 4A of FIG. 4. When this transition is viewed from the sensor section 50 side, the operator OP standing still seems to move to the right and left as shown by the arrow B in FIG. 5.

Figure 5:
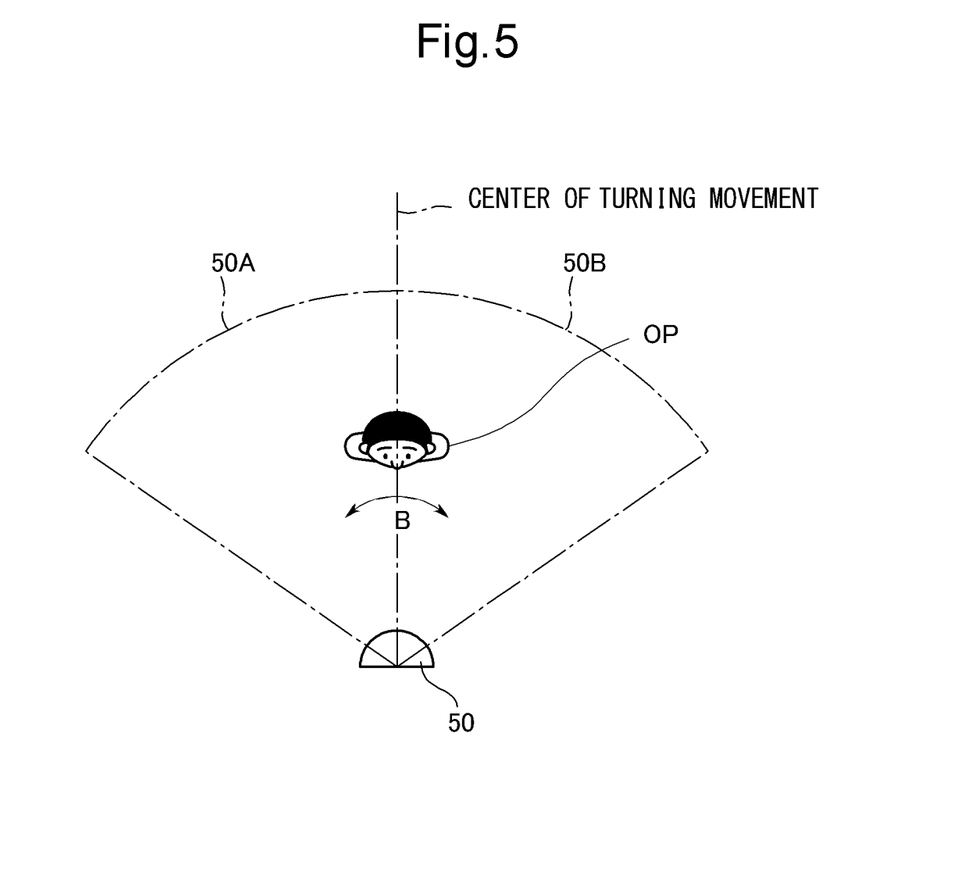
FIG. 5 is a schematic view showing how the operator standing still moves relatively to the oscillating sensor section in the one embodiment of the present disclosure.

As described above, the control section 100 controls the oscillating mechanism 60 to oscillate the sensor section 50. Therefore, even when an operator (human body) OP as an object stands still in the sensing area of the sensor section 50, the operator OP as the object relatively moves to the sensor section 50. Thus, with reference to the sensor section 50, the operator standing still can be moved between the sensing zone 50A and the sensing zone 50B. Therefore, even when the operator OP stands still in the sensing area, the infrared rays acquired from the operator OP in the sensing zones 50A, 50B by the pyroelectric infrared sensor 501 can be changed, so that the sensor section 50 can accurately detect the presence or absence of the operator OP based on the amount of change in infrared rays. Hence, a human body standing still can be detected by the pyroelectric infrared sensor 501 more accurately than before.

In addition, since the accuracy at which the sensor section 50 detects the presence or absence of the operator OP is improved as described above, it can be prevented that despite the operator OP is near the image forming apparatus 1, the control section 100 shifts the image forming apparatus 1, for example, to the sleep mode. Thus, the operational convenience for the operator OP can be increased.

Specifically, for a general human body sensor which uses an amount of change in infrared rays to detect the presence or absence of a human body, when a human body radiating infrared rays stands still in the sensing area of the sensor and the amount of infrared rays generated is thus held unchanged, the human body may become undetected by the sensor. In this case, despite the operator stays near the image forming apparatus, the control section of the image forming apparatus may shift the image forming apparatus to the sleep mode based on the fact that the human body is undetected. This presents disadvantages, such as impaired operational convenience for the operator. In contrast, with the sensor section 50 and the oscillating mechanism 60 in this embodiment, even a human body standing still can be accurately detected as described above unlike the general human body sensor.

Figure 6:
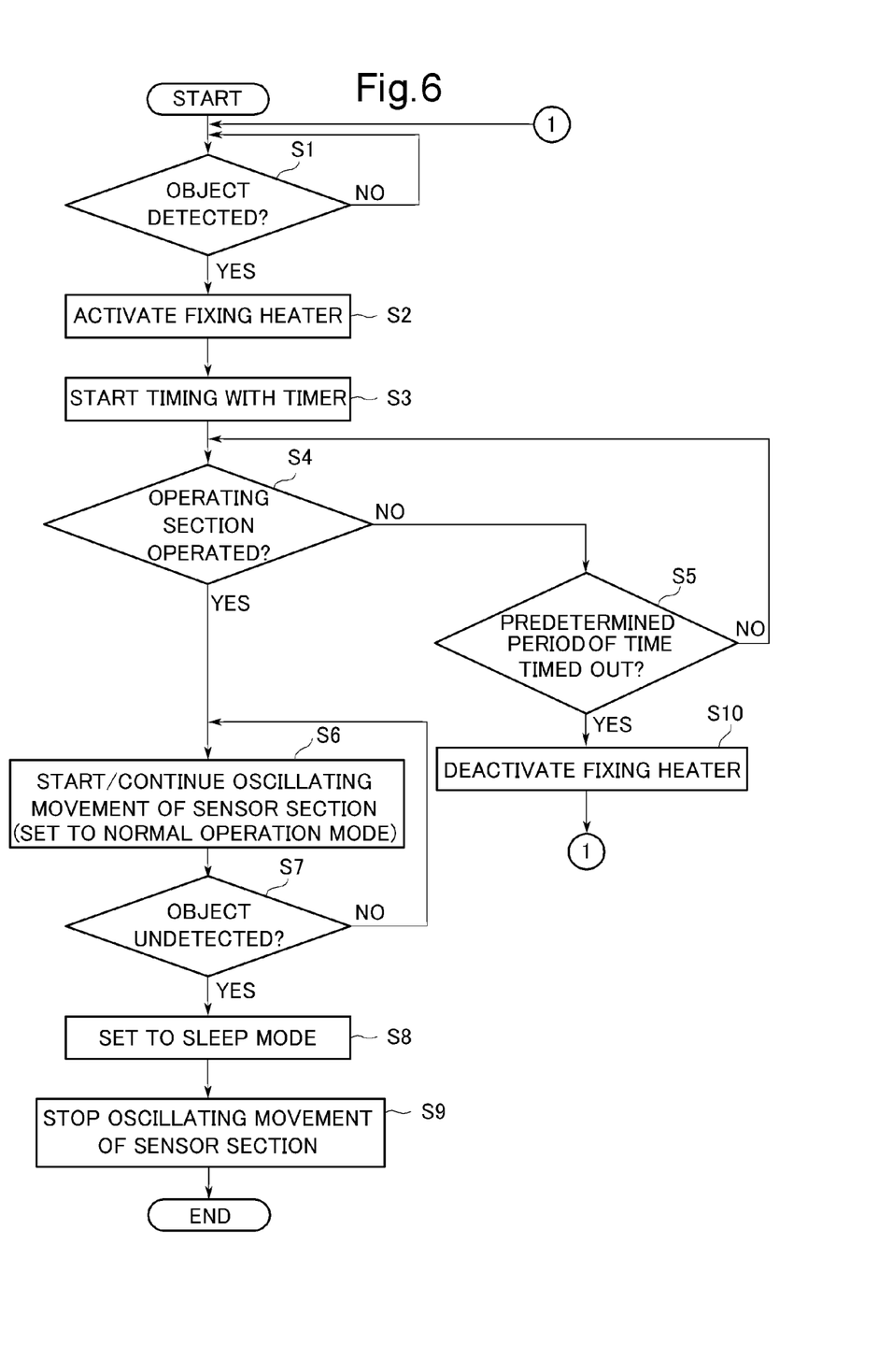
FIG. 6 is a flowchart showing human body detection and operation mode shift processing in the image forming apparatus according to the one embodiment of the present disclosure.

Next, a description will be given of human body detection and operation mode shift processing in the image forming apparatus 1. FIG. 6 is a flowchart showing the human body detection and operation mode shift processing in the image forming apparatus 1.

Before the processing starts, the image forming apparatus 1 is set to the sleep mode, in which the sensor section 50 does not oscillate and is in the default position. When in this state an object to be detected (a person) approaches the image forming apparatus 1 and enters the sensing area of the sensor section 50, the sensor section 50 detects the approaching object (YES in S1). This detection triggers the control section 100 to activate the fixing heater 136 (S2) and start timing (S3) with a timer (for example, incorporated in the control section 100). At this time, the control section 100 may set the image forming apparatus 1 to the normal operation mode. The timer may be a hardware timer or a software timer implemented, for example, by the CPU in the control section 100.

The control section 100 monitors whether or not any command has been input to the operating section 47 before the elapse of the aforementioned predetermined period of time since the timer started timing (S4, S5). For example, when a person as an object approaching the image forming apparatus 1 touches a touch panel or an operating key of the operating section 47 in order to use the image forming apparatus 1, the operating section 47 detects that an operator has operated it, and sends a signal to the control section 100. Based on this signal, the control section 100 detects that the operating section 47 has been operated.

While the control section 100 does not detect that the operating section 47 has been operated (NO in S4) and the predetermined period of time has not yet been timed out by the timer (NO in S5), the processing returns to S4.

On the other hand, when the predetermined period of time has been timed out by the timer (YES in S5) while the control section 100 has not yet detected that the operating section 47 has been operated (NO in S4), the control section 100 deactivates the fixing heater 136 (S10) and allows the sensor section 50 to detect again whether or not there is a person approaching the image forming apparatus 1 (S1). At this time, if the control section 100 has already set the image forming apparatus 1 to the normal operation mode during the processing in S2, the control section 100 returns the image forming apparatus 1 to the sleep mode. Because the object detected by the sensor section 50 is highly likely to be not an operator of the image forming apparatus 1 but a passerby or the like, the processing returns to S1.

When the control section 100 detects that the operating section 47 has been operated (YES in S4) while the predetermined period of time has not been timed out by the timer (NO in S5), i.e., upon satisfaction of the condition that the sensor section 50 detects an operator as an object and the operator as the object operates the operating section 47 within the predetermined period of time after the operator has been detected, the control section 100 controls the oscillating mechanism 60 to start the oscillating movement (S6). If during the processing in S2 the control section 100 has not set the image forming apparatus 1 to the normal operation mode, the control section 100 sets the image forming apparatus 1 to the normal operation mode during the processing in S6.

Thus, even when the operator stands still in the sensing area of the sensor section 50, the amount of infrared rays acquired from the operator by the sensor section 50 including the pyroelectric infrared sensor 501 can be changed, so that the sensor section 50 can accurately detect the presence or absence of the operator based on the amount of change in infrared rays. Hence, a human body standing still can be detected by the pyroelectric infrared sensor 501 more accurately than before.

If the timing of start of the oscillating movement is not specified but the oscillating mechanism 60 always oscillates the sensor section 50, in the presence of a stationary object radiating infrared rays other than an operator in the sensing area of the sensor section 50, the sensor section 50 will detect a change in infrared rays of the stationary object and thus may cause a false detection of the presence of an operator in spite of absence of any operator. Unlike this, the control section 100 in this embodiment, as described above, controls the oscillating mechanism 60 to start the oscillating movement only when an operator as an object is detected by the sensor section 50 and the operator operates the operating section 47 within the predetermined period of time after the object has been detected. Thus, the control section 100 allows the oscillating mechanism 60 to oscillate the sensor section 50 only if the operator as the object is highly likely to be present near the image forming apparatus 1. This increases the accuracy of detecting an object when the sensor section 50 has detected the presence of an operator based on a change in amount of infrared rays acquired by the sensor section 50.

After the oscillating movement starts, the control section 100 allows the oscillating mechanism 60 to continue the oscillating movement (S6) and holds the image forming apparatus 1 in the normal operation mode as long as the operator is detected by the sensor section 50 (NO in S7). On the other hand, when the object becomes undetected by the sensor section 50 (YES in S7), the control section 100 sets the image forming apparatus 1 to the sleep mode and deactivates the fixing heater 136 to stop the heating of the heat roller 132 (S8). Furthermore, the control section 100 controls the oscillating mechanism 60 to stop the oscillating movement (S9).

Although not shown in FIG. 6, it is needless to say that if the image forming apparatus is executing any job when the object becomes undetected by the sensor section 50 (YES in S7), the control section 100 sets the image forming apparatus to the sleep mode after the job has ended.

As described previously, even if the operator stands still anterior to the image forming apparatus 1, he/she can be continuously detected because of the oscillation of the sensor section 50. When the operator disappears from anterior to the image forming apparatus 1, the sensor section 50 no longer detects the object based on a change in amount of infrared rays although it is oscillating. Based on the detection signal from the sensor section 50 at this time, which indicates the absence of the object, the control section 100 can determine that the sensor section 50 has not detected the operator, i.e., that the operator has not been present anterior to the image forming apparatus 1.

Upon entry of a next operator in the sensing area of the sensor section 50 after a previous object has become undetected by the sensor section 50 and a previous operator as the object has disappeared from the sensing area, the sensor section 50 can detect a change in amount of infrared rays generated by the next operator, even without the oscillating movement, based on the action of entry of the next operator. Therefore, in this embodiment, when the object becomes undetected by the sensor section 50 after the start of the oscillating movement of the oscillating mechanism 60, the control section 100 controls the oscillating mechanism 60 to stop the oscillating movement. Thus, the power consumption taken for the oscillating movement of the oscillating mechanism 60 can be reduced without reducing the accuracy of the sensor section 50 to detect an object.

As described previously, at the time when the sensor section 50 has detected an object, the control section 100 activates the fixing heater 136 to heat the heat roller of the fixing section 13. In other words, before the operator operates the operating section 47 and as soon as the operator is going to be highly likely to input an operation command to the image forming apparatus 1, the fixing heater 136 is activated. Therefore, the fixing section 13 can be heated by the use of the time from the detection of the operator to the operator's reaching the operating section 47. Thus, the fixing temperature during standby can be set lower than in apparatuses equipped with no sensor section 50 and the electric power taken to heat the fixing section 13 can be reduced.

As described previously, if the condition is not satisfied that an object is detected by the sensor section 50 and an operator as the object operates the operating section 47 within the predetermined period of time after the object has been detected, the control section 100 shifts the image forming apparatus 1 to the sleep mode. Therefore, the power consumption of the image forming apparatus 1 can be reduced.

The present disclosure is not limited to the above embodiment and can be modified in various ways. Although the description of the above embodiment is given taking a multifunction peripheral as an example of the electronic apparatus according to the present disclosure, the example is merely illustrative and the electronic apparatus may be any electronic apparatus other than multifunction peripherals, for example, any other image forming apparatus, such as a printer, a copier or a facsimile machine.

The structure and processing shown in the above embodiment with reference to FIGS. 1 to 6 are merely illustrative of the present disclosure and not intended to limit the present disclosure to the above particular structure and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An electronic apparatus comprising:
   an operating section operable by an operator;
   a sensor section including a pyroelectric infrared sensor configured to detect the presence of an object based on a change in infrared rays;
   an oscillating mechanism configured to cause the sensor section to perform an oscillating movement in a predetermined direction; and
   a control section configured to control the oscillating mechanism to start the oscillating movement upon satisfaction of a condition that the operator as the object operates the operating section within a predetermined period of time after the object has been detected by the sensor section in a state the oscillating mechanism has stopped the oscillating movement, the control section being further configured to control the oscillating mechanism to stop the oscillating movement when the object becomes undetected by the sensor section after the control section has controlled the oscillating mechanism to start the oscillating movement.

2. The electronic apparatus according to claim 1, wherein the oscillating mechanism is configured to cause the sensor section to perform the oscillating movement in a horizontal direction which is the predetermined direction.

3. The electronic apparatus according to claim 1, wherein the control section is capable of selectively setting the electronic apparatus to a normal operation mode for bringing the electronic apparatus into a normally operable state or a sleep mode for bringing the electronic apparatus into a power-saving state, sets the electronic apparatus to the normal operation mode upon detection of the object by the sensor section, and sets the electronic apparatus to the sleep mode if the condition is not satisfied.

4. The electronic apparatus according to claim 1, wherein the control section is capable of selectively setting the electronic apparatus to a normal operation mode for bringing the electronic apparatus into a normally operable state or a sleep mode for bringing the electronic apparatus into a power-saving state, sets the electronic apparatus to the normal operation mode upon detection of the object by the sensor section, and sets the electronic apparatus to the sleep mode if the condition is not satisfied.

5. The electronic apparatus according to claim 1, wherein the control section is capable of selectively setting the electronic apparatus to a normal operation mode for bringing the electronic apparatus into a normal operation or a sleep mode for bringing the electronic apparatus into a power-saving state, sets the electronic apparatus to the normal operation mode if the condition is satisfied, and sets the electronic apparatus to the sleep mode if the condition is not satisfied.

6. An image forming apparatus serving as the electronic apparatus according to claim 1, the image forming apparatus comprising:
    an image forming section configured to form an image on a recording medium; and
    a fixing section configured to fix the image on the recording medium on which the image has been formed by the image forming section.

7. The image forming apparatus according to claim 6, wherein
    the fixing section comprises: a heat roller and a pressure roller which are configured to fix the image on the recording medium; and a heater configured to heat the heat roller, and
    the control section activates the heater upon detection of the object by the sensor section and deactivates the heater if the operating section is unoperated by the operator for the predetermined period of time after the object has been detected by the sensor section.

* * * * *